(12) United States Patent
Kang

(10) Patent No.: US 7,921,958 B2
(45) Date of Patent: Apr. 12, 2011

(54) APPARATUS FOR DRIVING STEERING SHAFT IN MOTOR-DRIVEN POWER STEERING

(75) Inventor: Taehan Kang, Hwaseong-si (KR)

(73) Assignee: Hyundai Motor Company, Seoul (KR)

( * ) Notice: Subject to any disclaimer, the term of this patent is extended or adjusted under 35 U.S.C. 154(b) by 328 days.

(21) Appl. No.: 12/274,091

(22) Filed: Nov. 19, 2008

(65) Prior Publication Data

US 2009/0294204 A1 Dec. 3, 2009

(30) Foreign Application Priority Data

May 27, 2008 (KR) .................. 10-2008-0048945

(51) Int. Cl.
B62D 5/04 (2006.01)
(52) U.S. Cl. .................. 180/444; 180/443
(58) Field of Classification Search .............. 180/443, 180/444
See application file for complete search history.

(56) References Cited

U.S. PATENT DOCUMENTS

| 4,223,254 | A | * | 9/1980 | Adams | 318/2 |
| 4,577,716 | A | * | 3/1986 | Norton | 180/446 |
| 4,726,437 | A | * | 2/1988 | Norton | 180/444 |
| 7,325,638 | B1 | * | 2/2008 | Belloso | 180/69.6 |
| 2007/0209862 | A1 | * | 9/2007 | Budaker et al. | 180/444 |

FOREIGN PATENT DOCUMENTS

| JP | 2270675 A | 11/1990 |
| JP | 6293268 A | 10/1994 |
| JP | 6344929 A | 12/1994 |
| JP | 10-181580 A | 7/1998 |

* cited by examiner

*Primary Examiner* — Joanne Silbermann
*Assistant Examiner* — Michael R Stabley
(74) *Attorney, Agent, or Firm* — Morgan, Lewis & Bockius LLP

(57) ABSTRACT

An apparatus for driving a steering shaft in a motor-driven power steering system may include a pinion gear having a joining protrusion and a power transmission bearing member provided with a joining groove to be removably inserted with the joining protrusion of the pinion gear, wherein the power transmission bearing member rotates integrally with the pinion gear by being joined each other when the pinion gear is disengaged from a flywheel ring gear of an engine and thereby transmits rotation force of the power transmission bearing member to the wormwheel connected with a steering shaft.

20 Claims, 4 Drawing Sheets

APPARATUS FOR DRIVING STEERING SHAFT IN MOTOR-DRIVEN POWER STEERING

CROSS-REFERENCE TO RELATED APPLICATION

The present application claims priority to Korean Application Number 10-2008-0048945 filed May 27, 2008, the entire contents of which application is incorporated herein for all purposes by this reference.

BACKGROUND OF THE INVENTION

1. Field of the Invention

The present invention relates to an apparatus for driving a steering shaft in a motor-driven power steering system, which is capable of performing a starting function and a steering force improvement function of a vehicle by using one single motor.

2. Description of Related Art

Generally, a vehicle with a motor-driven power steering system (hereinafter, referred to as 'MDPS') separately has a starter motor for starting the vehicle and a MDPS motor for improving steering force.

When a starting signal is inputted into a magnet switch, the starter motor is driven. A pinion gear is rotated by rotation force of the starter motor and a flywheel ring gear is rotated by rotation force of the pinion gear.

The flywheel ring gear is connected to a crankshaft and the crankshaft is connected to a piston of an engine, thereby starting the vehicle.

When a driver rotates a steering wheel after starting the vehicle, a torque sensor detects a steering angle of the steering wheel and transmits a signal thereof to an ECU (Electronic Control Unit). The ECU drives the MDPS motor by using information inputted from the torque sensor. A steering shaft is rotated by driving the MDPS motor, thereby improving the steering force.

However, since the starter motor is not separately used after starting the starter motor, a structure in which the vehicle with the MDPS separately has the starter motor and the MDPS motor is very inefficient in consideration of securing of a narrow space of and an installation space of an engine compartment, and manufacturing cost.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY OF THE INVENTION

Various aspects of the present invention are directed to provide an apparatus for driving a steering shaft in a motor-driven power steering system having a starting function, which is capable of decreasing the number of components and manufacturing cost, and improve spatial design flexibility of a narrow engine compartment by allowing a starter motor to be commonly used as an MDPS motor.

An apparatus for driving a steering shaft in a motor-driven power steering system according to an aspect of the present invention may include a pinion gear having a joining protrusion on a lateral surface thereof facing an electric motor, the pinion gear connected to a front end of a motor shaft of the electric motor and rotating integrally with the motor shaft a power transmission bearing member slidably coupled to the motor shaft between the electric motor and the pinion gear and provided with a joining groove formed on a lateral surface thereof facing the pinion gear to removably receive the joining protrusion of the pinion gear, wherein the power transmission bearing member rotates integrally with the pinion gear by being joined together when the pinion gear is disengaged from a flywheel ring gear of an engine a power transmission belt coupling the power transmission bearing member and a wormwheel of the steering shaft and thereby transmitting rotation force of the power transmission bearing member to the wormwheel, and/or a controller controlling the electric motor by receiving information on a steering angle of a steering wheel from a torque sensor.

The motor shaft may be configured to be protrudable from a front side of the electric motor.

In another aspect of the present invention, the apparatus for driving a steering shaft in a motor-driven power steering system may further include an actuator to move the pinion gear in a longitudinal direction of the motor shaft according to the controller.

The actuator may include a starter motor controlled by the controller a plunger coupled to the starter motor and linearly movable by the starter motor a lever configured to be rotatable around a center shaft, one of which is pivotally coupled to the plunger a spool member formed on the motor shaft, wherein the other end of the lever is slidably coupled to the spool member.

A plurality of joining protrusions may be disposed on the lateral surface of the pinion gear facing the electric motor with an equal angular interval around the motor shaft and a plurality of joining grooves may be provided on the lateral surface of the power transmission bearing facing the pinion gear so as to be removably coupled each other.

The power transmission bearing member may include an inner wheel slidably engaged with the motor shaft of the electric motor so that the power transmission bearing member moves linearly in a longitudinal direction of the motor shaft an outer wheel rotatably coupled to outer circumference of the inner wheel and having the plurality of joining grooves on a lateral surface thereof facing the pinion gear, wherein the power transmission belt is engaged around outer circumference of the outer wheel, and/or a gear groove formed on the outer circumference surface of the outer wheel for connection with the power transmission belt therein, and/or a ball bearing disposed between the inner wheel and the outer wheel and slidably connecting the outer wheel with the inner wheel.

The methods and apparatuses of the present invention have other features and advantages which will be apparent from or are set forth in more detail in the accompanying drawings, which are incorporated herein, and the following Detailed Description of the Invention, which together serve to explain certain principles of the present invention.

The methods and apparatuses of the present invention have other features and advantages which will be apparent from or are set forth in more detail in the accompanying drawings, which are incorporated herein, and the following Detailed Description of the Invention, which together serve to explain certain principles of the present invention.

DETAILED DESCRIPTION OF THE INVENTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Since an engine of a vehicle cannot be independently started, a flywheel ring gear should be rotated by driving a starter motor with a starting switch.

Figure 1:
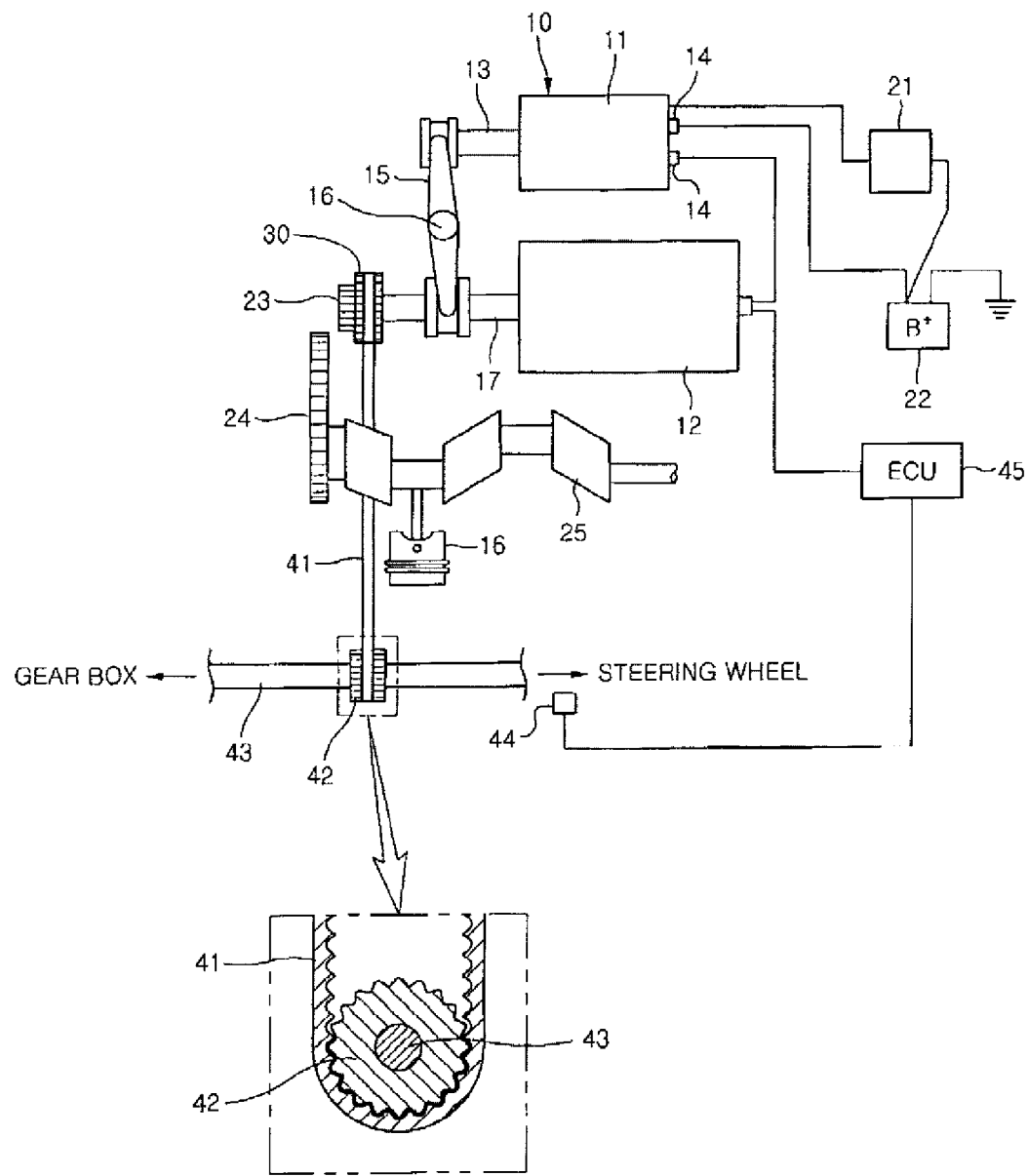
FIGS. 1 and 2 illustrate an exemplary apparatus for driving a steering shaft in a motor-driven power steering system according to the present invention.
Figure 2:
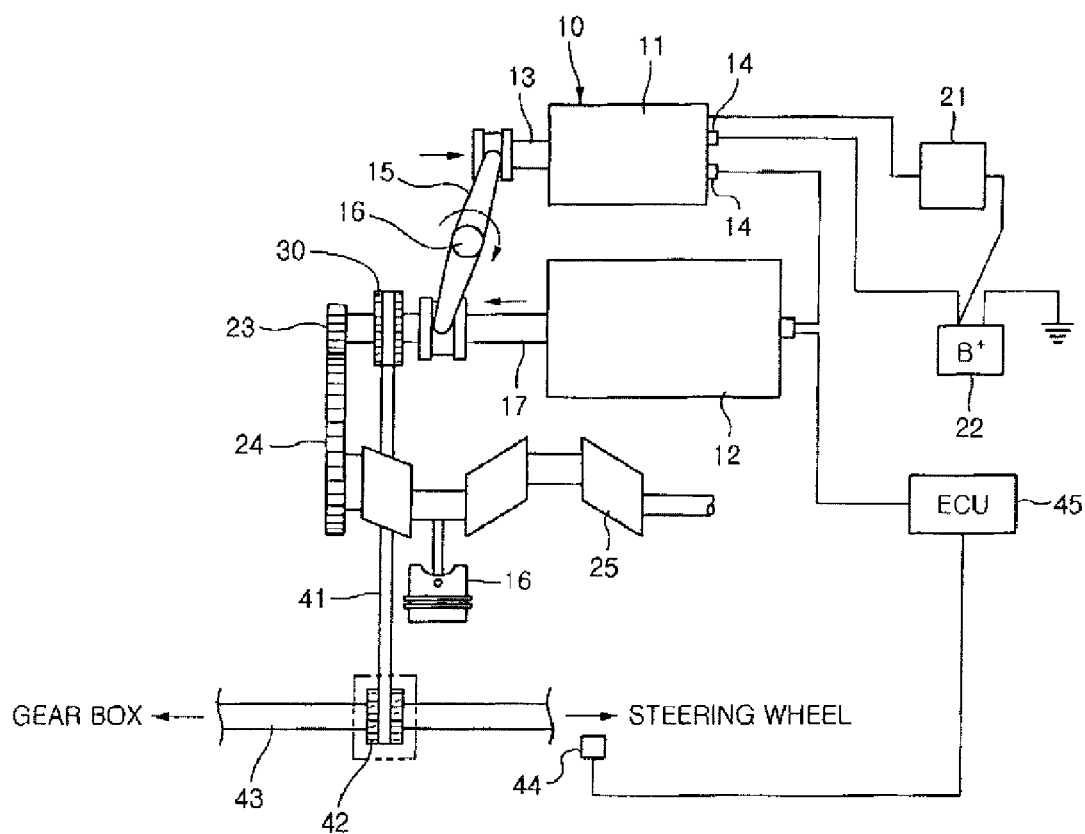

That is, as shown in FIGS. 1 and 2, a starter motor 10 includes a limit switch 11 and an electric motor 12. A starting switch 21 includes four steps such as LOCK, ACC, ON, and START in order to start the engine of the vehicle.

When the starting switch 21 is positioned in the START step, a current flows through a battery 22. When the limit switch 11 is activated, a plunger 13 moves to a BM terminal 14 while being electromagnetized and at the same time, the lever 15 rotates around a center shaft 16 to be turned.

In various embodiments of the present invention, the electric motor 12 includes a motor shaft 17 which can protrude forwards from the front side of the electric motor 12. The motor shaft 17 includes a spool member 19 to slidably receive one end portion of the lever 15.

Accordingly as the plunger 13 retracts backwards by the starter motor 10, the motor shaft 17 protrudes forwards from the front side of the electric motor 12, a pinion gear 23 integrally formed at a front end of the motor shaft 17 is engaged with a flywheel ring gear 24 and then a large current flows to the electric motor 12, thereby starting driving of the electric motor 12.

When the electric motor 12 is driven, the rotation force of the motor shaft 17 is transmitted to a crankshaft 25 through the pinion gear 23 and the flywheel ring gear 24, and a piston 16 of the engine is operated by the rotation force of the crankshaft 25, thereby starting the vehicle.

When the vehicle is started and a driver releases a starting key, the starting key 21 is restored to the ON step which is a previous step of the START step to be short-circuited and the current stops to flow, thereby terminating the driving of the electric motor 12.

At the same time, the motor shaft 17 retreats to the electric motor 12, and as engagement between the pinion gear 23 and the flywheel ring gear 24 is released, all mechanical devices are restored to a state before starting the vehicle and prepares for the next operation.

Meanwhile, in various embodiments of the present invention, the starter motor 10 may be commonly used for an MDPS motor.

That is, when the motor shaft 17 retreats to the electric motor 12, the engagement between the pinion gear 23 and the flywheel ring gear 24 is released. From this time, the pinion gear 23 is joined to a power transmission bearing member 30.

The power transmission bearing member 30 is co-axially provided on the motor shaft 17 between the electric motor 12 and the pinion gear 23.

Figure 3:
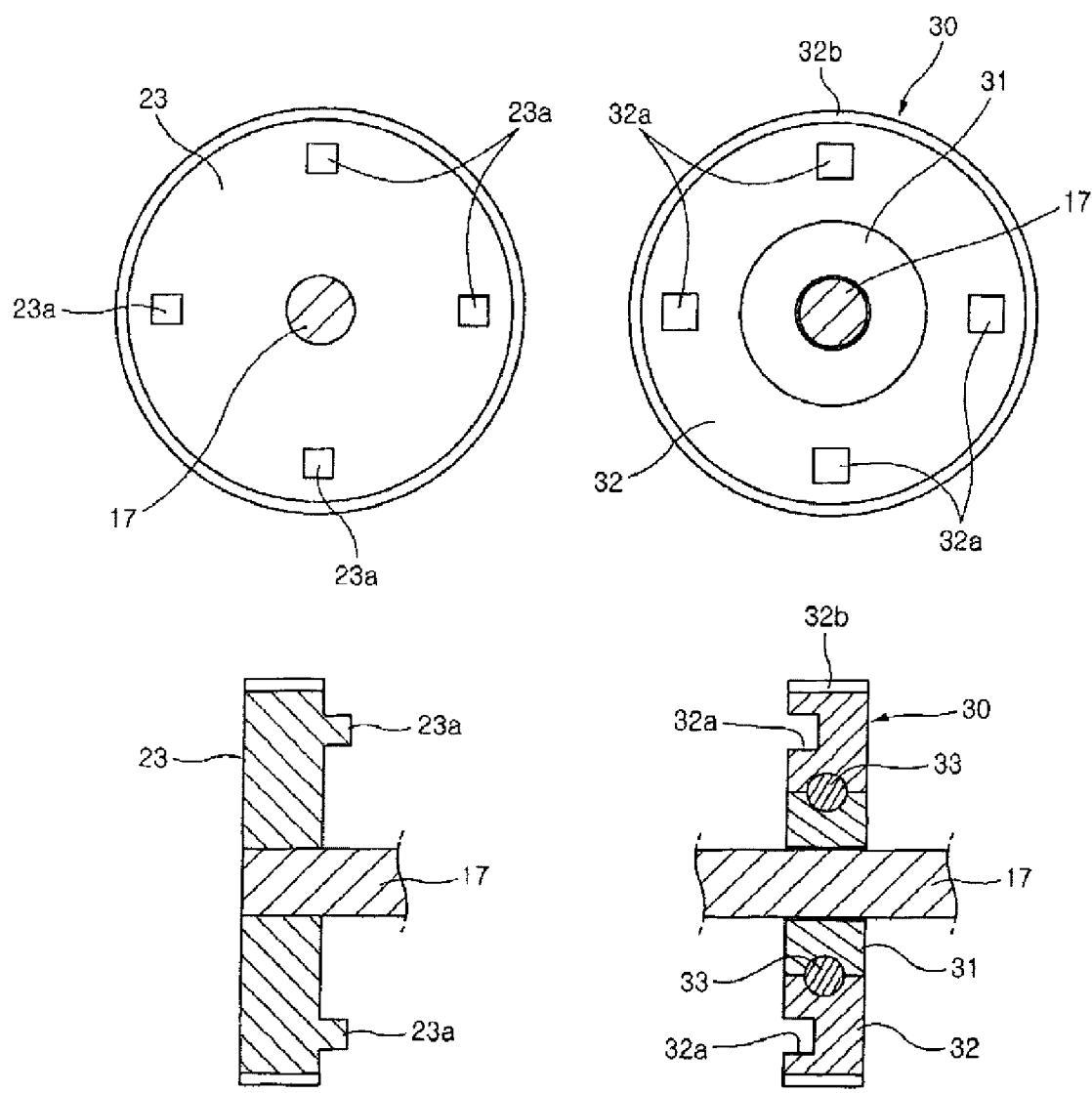
FIGS. 3 and 4 illustrate an exemplary pinion gear and power transmission bearing member according to the present invention.
Figure 4:
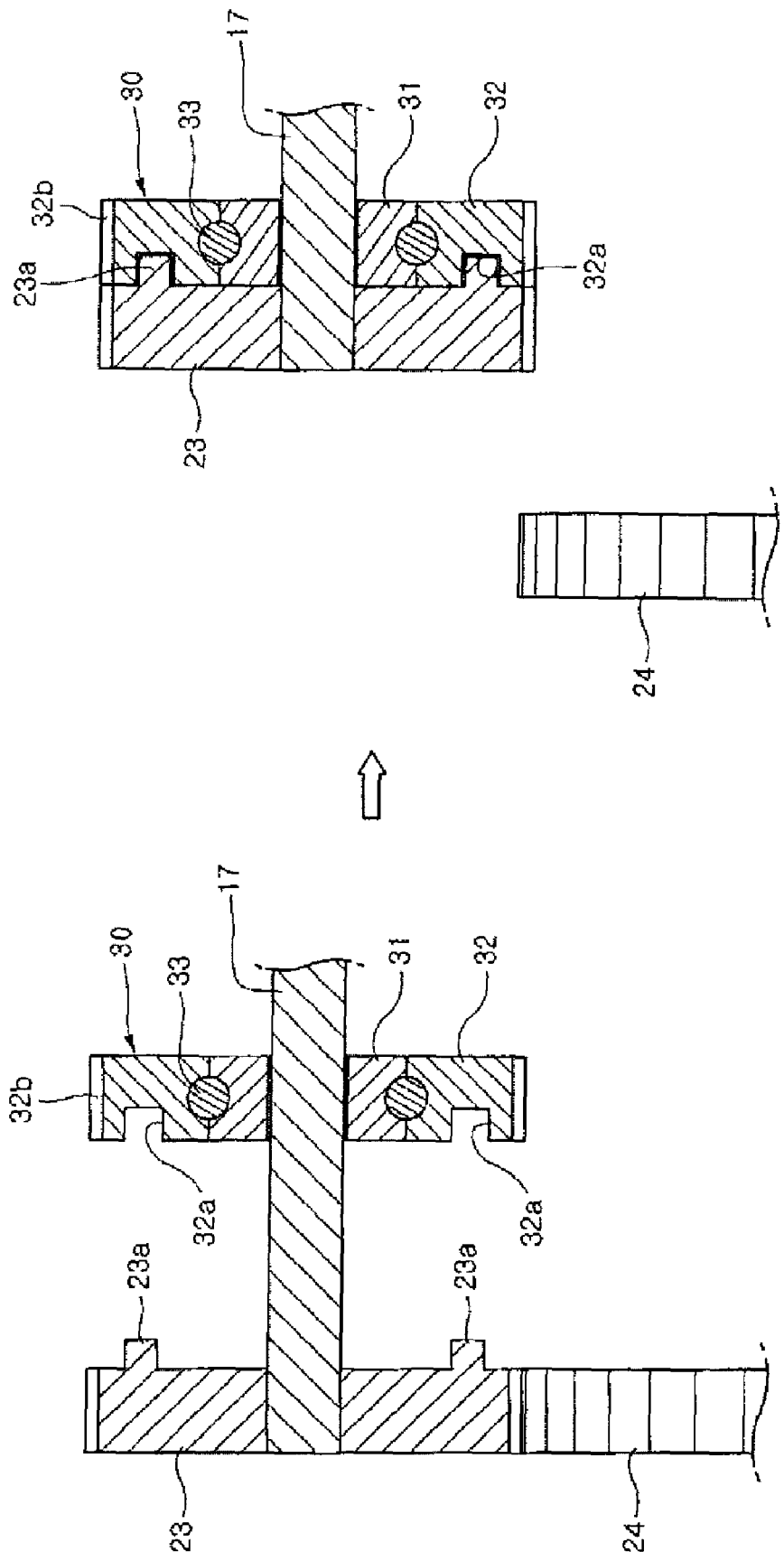

As shown in FIGS. 3 and 4, a plurality of joining protrusions 23a are provided on a lateral surface of the pinion gear 23 facing the power transmission bearing member 30 and a plurality of joining grooves 32a male and female-joined with the joining protrusions 23a of the pinion gear 23 are provided on a lateral surface of the power transmission bearing member 30 facing the pinion gear 23.

The joining protrusions 23a are freely inserted and joined to the joining grooves 32a in linear movement of the motor shaft 17. In addition, the joining protrusions 23a are freely separated from the joining grooves 32a and thus are decoupled from the joining grooves 32a.

The power transmission bearing member 30 includes an inner wheel 31 engaged with the motor shaft 17 so that the motor shaft 17 moves linearly in a lengthwise direction of the motor shaft 17, an outer wheel 32 having the plurality of joining grooves 32a removably inserted with the joining protrusions 23a on a lateral surface thereof, and a ball bearing 33 connecting the inner wheel 31 with the outer wheel 32.

A gear groove 32b is formed on an outer circumference surface of the outer wheel 32.

When the motor shaft 17 rotates in a state that the pinion gear 23 is joined to the power transmission bearing member 30, the outer wheel 32 of the power transmission bearing member 30 rotates integrally with the motor shaft 17. When the motor shaft 17 rotates in a state that the pinion gear 23 is not joined to the power transmission bearing member 30 but engages with the flywheel ring gear 24, the outer wheel 32 of the power transmission bearing member 30 does not rotate irrespective of the motor shaft 17.

The outer wheel 32 of the power transmission bearing member 30 is connected to a wormwheel 42 constituting the MDPS through a power transmission belt 41.

That is, the power transmission belt 41 is joined to the gear groove 32b of the outer wheel 32 through a gear groove provided on an outer circumference surface of the wormwheel 42, thereby connecting the outer wheel 32 of the power transmission bearing member 30 with the wormwheel 42.

The wormwheel 42 is pierced by a steering shaft 43 and is joined integrally with the steering shaft 43 in the MDPS. Since a joining structure of the wormwheel 42 and the steering shaft 43 is a general structure of the MDPS, the detailed description thereof will be omitted.

When the pinion gear 23 is joined to the power transmission bearing member 30 and the outer wheel 32 of the power transmission bearing member 30 rotates with the motor shaft 17 simultaneously, the rotation force of the motor shaft 17 is transmitted to the steering shaft 43 through the outer wheel 32 of the power transmission bearing member 30 and the wormwheel 42, thereby rotating the steering shaft 43.

The MDPS includes a torque sensor 44 detecting information on a steering angle of a steering wheel and a controller 45 receiving the information from the torque sensor 44. The controller 45 controls a driving time and a driving direction and driving speed and the driving time of the electric motor 12 on the basis of the information received from the torque sensor 44.

Accordingly, in various embodiments of the present invention, in starting the vehicle, the pinion gear 23 engages with the flywheel ring gear 24 and thus power of the electric motor 12 is transmitted to the crankshaft 25 to start the vehicle. After the starting of the vehicle is terminated, the pinion gear 23 and the flywheel ring gear 24 is disengaged from each other, while the pinion gear 23 is joined to the power transmission bearing member 30, thereby transmitting the power of the electric motor 12 to the steering shaft 43 through the power transmission belt 41 and the wormwheel 42.

In such a state, when the steering angle of the steering wheel is generated, the torque sensor 44 detects the information on the steering angle of the steering wheel and transmits the information to the controller 45, and the controller 45 controls the driving of the electric motor 12 by calculating the information received from the torque sensor 44, and engine speed and a vehicle speed.

When the electric motor 12 is driven by the control of the controller 45, the rotation force of the motor shaft 17 is transmitted the steering shaft 43 through the outer wheel 32 of the power transmission bearing member 30, the power transmission belt 41, and the wormwheel 42, to the steering shaft 43. Therefore, it is possible to improve steering force.

As described above, according to various embodiments of the present invention, the starter motor 10 used in starting the vehicle may be also used for the MDPS motor after the starting is terminated, thereby decreasing the number of components and manufacturing cost.

In various embodiments of the present invention, it is possible to improve design flexibility for an installation structure and more efficiently utilize a space of an engine compartment in consideration of the narrow space of the engine compartment.

In detail, in various aspects of the present invention for the apparatus for driving a steering shaft in a motor-driven power steering system, a starter motor used in starting a vehicle may be also used for an MDPS motor after the starting is terminated, whereby it is possible to decrease the number of components and manufacturing cost, and to more efficiently utilize a space of an engine compartment by improving design flexibility for an installation structure and in consideration of the narrow space of the engine compartment.

According to an aspect of the present invention, after a starting operation is terminated, a starter motor used in the starting operation is used as an MDPS motor, thereby decreasing the number of components and manufacturing cost, and improving design flexibility with respect to an installation structure in consideration of a narrow space of an engine compartment. Therefore, it is possible to more efficiently utilize the space of the engine compartment.

For convenience in explanation and accurate definition in the appended claims, the terms "front" and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the claims appended hereto and their equivalents.

What is claimed is:

1. An apparatus for driving a steering shaft in a motor-driven power steering system, comprising:
    a pinion gear having a joining protrusion on a lateral surface thereof facing an electric motor, the pinion gear connected to a front end of a motor shaft of the electric motor and rotating integrally with the motor shaft;
    a power transmission bearing member slidably coupled to the motor shaft between the electric motor and the pinion gear and provided with a joining groove formed on a lateral surface thereof facing the pinion gear to removably receive the joining protrusion of the pinion gear, wherein the power transmission bearing member rotates integrally with the pinion gear by being joined together when the pinion gear is disengaged from a flywheel ring gear of an engine;
    a power transmission belt coupling the power transmission bearing member and a wormwheel of the steering shaft and thereby transmitting rotation force of the power transmission bearing member to the wormwheel; and
    a controller controlling the electric motor by receiving information on a steering angle of a steering wheel from a torque sensor.

2. The apparatus as defined in claim 1, wherein the motor shaft is configured to be protrudable from a front side of the electric motor.

3. The apparatus as defined in claim 1, further comprises an actuator to move the pinion gear in a longitudinal direction of the motor shaft according to the controller.

4. The apparatus as defined in claim 3, wherein the actuator comprises:
    a starter motor controlled by the controller;
    a plunger coupled to the starter motor and linearly movable by the starter motor;
    a lever configured to be rotatable around a center shaft, one of which is pivotally coupled to the plunger;
    a spool member formed on the motor shaft, wherein the other end of the lever is slidably coupled to the spool member.

5. The apparatus as defined in claim 1, wherein a plurality of joining protrusions are disposed on the lateral surface of the pinion gear facing the electric motor with an equal angular interval around the motor shaft and a plurality of joining grooves are provided on the lateral surface of the power transmission bearing facing the pinion gear so as to be removably coupled each other.

6. The apparatus as defined in claim 5, wherein the power transmission bearing member comprises:
    an inner wheel slidably engaged with the motor shaft of the electric motor so that the power transmission bearing member moves linearly in a longitudinal direction of the motor shaft;
    an outer wheel rotatably coupled to outer circumference of the inner wheel and having the plurality of joining grooves on a lateral surface thereof facing the pinion gear, wherein the power transmission belt is engaged around outer circumference of the outer wheel;
    a gear groove formed on the outer circumference surface of the outer wheel for connection with the power transmission belt therein; and
    a ball bearing disposed between the inner wheel and the outer wheel and slidably connecting the outer wheel with the inner wheel.

7. The apparatus as defined in claim 5, wherein the power transmission bearing member comprises:
    an inner wheel slidably engaged with the motor shaft of the electric motor so that the power transmission bearing member moves linearly in a longitudinal direction of the motor shaft; and
    an outer wheel rotatably coupled to outer circumference of the inner wheel and having the plurality of joining grooves on a lateral surface thereof facing the pinion gear, wherein the power transmission belt is engaged around outer circumference of the outer wheel.

8. The apparatus as defined in claim 7, further comprises a ball bearing disposed between the inner wheel and the outer wheel and slidably connecting the outer wheel with the inner wheel.

9. The apparatus as defined in claim 1, wherein the power transmission bearing member comprises:
   an inner wheel slidably engaged with the motor shaft of the electric motor so that the power transmission bearing member moves linearly in a longitudinal direction of the motor shaft;
   an outer wheel rotatably coupled to outer circumference of the inner wheel and having the joining groove on a surface lateral surface thereof facing the pinion gear, wherein the power transmission belt is engaged around outer circumference of the outer wheel;
   a gear groove formed on the outer circumference surface of the outer wheel for connection with the power transmission belt therein; and
   a ball bearing disposed between the inner wheel and the outer wheel and slidably connecting the outer wheel with the inner wheel.

10. The apparatus as defined in claim 1, wherein the power transmission bearing member comprises:
    an inner wheel slidably engaged with the motor shaft of the electric motor so that the power transmission bearing member moves linearly in a longitudinal direction of the motor shaft;
    an outer wheel rotatably coupled to outer circumference of the inner wheel and having the joining groove on a lateral surface thereof facing the pinion gear, wherein the power transmission belt is engaged around outer circumference of the outer wheel; and
    a gear groove formed on the outer circumference surface of the outer wheel for connection with the power transmission belt therein.

11. The apparatus as defined in claim 10, further comprising a ball bearing disposed between the inner wheel and the outer wheel and slidably connecting the outer wheel with the inner wheel.

12. A system for driving a steering shaft in a motor-driven power steering system, comprising:
    a pinion gear having a joining protrusion on a lateral surface thereof facing an electric motor, the pinion gear connected to a front end of a motor shaft of the electric motor and rotating integrally with the motor shaft;
    a power transmission bearing member slidably coupled to the motor shaft between the electric motor and the pinion gear and provided with a joining groove formed on a lateral surface thereof facing the pinion gear to removably receive the joining protrusion of the pinion gear, wherein the power transmission bearing member rotates integrally with the pinion gear by being joined each other when the pinion gear is disengaged from a flywheel ring gear of an engine;
    a power transmission belt coupling the power transmission bearing member and a wormwheel of the steering shaft and thereby transmitting rotation force of the power transmission bearing member to the wormwheel; and
    a controller controlling the electric motor by receiving information on a steering angle of a steering wheel from a torque sensor.

13. The apparatus as defined in claim 12, further comprises an actuator to move the pinion gear in a longitudinal direction of the motor shaft according to controller.

14. The apparatus as defined in claim 13, wherein the actuator comprises:
    a starter motor controlled by the controller;
    a plunger coupled to the starter motor and linearly movable by the starter motor;
    a lever rotatable around a center shaft, one of which is pivotally coupled to the plunger;
    a spool member formed on the motor shaft, wherein the other end of the lever is slidably coupled to the spool member.

15. The apparatus as defined in claim 12, wherein a plurality of joining protrusions are disposed on the lateral surface of the pinion gear facing the electric motor with an equal angular interval around the motor shaft and a plurality of joining grooves are provided on the lateral surface of the power transmission bearing facing the pinion gear so as to be removably coupled each other.

16. The apparatus as defined in claim 15, wherein the power transmission bearing member comprises:
    an inner wheel slidably engaged with the motor shaft of the electric motor so that the power transmission bearing member moves linearly in a longitudinal direction of the motor shaft;
    an outer wheel rotatably coupled to outer circumference of the inner wheel and having the plurality of joining grooves on a lateral surface thereof facing the pinion gear, wherein the power transmission belt is engaged around outer circumference of the outer wheel;
    a gear groove formed on the outer circumference surface of the outer wheel for connection with the power transmission belt therein; and
    a ball bearing disposed between the inner wheel and the outer wheel and slidably connecting the outer wheel with the inner wheel.

17. The apparatus as defined in claim 12, wherein the power transmission bearing member comprises:
    an inner wheel slidably engaged with the motor shaft of the electric motor so that the motor shaft moves linearly in a longitudinal direction of the motor shaft;
    an outer wheel rotatably coupled to outer circumference of the inner wheel and having the joining groove on a surface lateral surface thereof facing the pinion gear, wherein the power transmission belt is engaged around outer circumference of the outer wheel;
    a gear groove formed on the outer circumference surface of the outer wheel for connection with the power transmission belt therein; and
    a ball bearing disposed between the inner wheel and the outer wheel and slidably connecting the outer wheel with the inner wheel.

18. A motor-driven power steering system comprising the apparatus as defined in claim 1, the apparatus operably connected to a steering wheel and a gear box.

19. A motor-driven power steering system comprising the apparatus as defined in claim 12, the apparatus operably connected to a steering wheel and a gear box.

20. A passenger vehicle comprising the motor-driven power steering system as defined in claim 18.

* * * * *